United States Patent [19]

Puryear

[11] Patent Number: 5,213,279
[45] Date of Patent: May 25, 1993

[54] CASTING IMPROVEMENT FOR SPIN CAST FISHING REELS

[75] Inventor: John W. Puryear, Sapulpa, Okla.

[73] Assignee: Zebco Corporation, Tulsa, Okla.

[21] Appl. No.: 693,963

[22] Filed: Apr. 29, 1991

[51] Int. Cl.⁵ .............................................. A01K 89/01
[52] U.S. Cl. ...................................... 242/239; 242/311
[58] Field of Search .............. 242/238, 239, 240, 241, 242/234–237, 311

[56] References Cited

U.S. PATENT DOCUMENTS

| | | | |
|---|---|---|---|
| 3,020,665 | 2/1962 | Hull | 242/240 |
| 3,146,965 | 9/1964 | Khazzam | 242/240 |
| 3,185,405 | 5/1965 | Hull | 242/240 |
| 3,223,347 | 12/1965 | Clark | 242/311 X |
| 3,381,914 | 5/1968 | Taggart | 242/238 |
| 3,498,562 | 3/1970 | Johnson | 242/240 |
| 3,697,011 | 10/1972 | Christiansen et al. | 242/240 |
| 3,730,455 | 5/1973 | Murphy | 242/311 X |
| 3,771,740 | 11/1973 | Nepote | 242/240 |
| 4,961,547 | 10/1990 | Peterson et al. | 242/238 |

*Primary Examiner*—John M. Jillions
*Assistant Examiner*—Michael R. Mansen
*Attorney, Agent, or Firm*—Wood, Phillips, VanSanten, Hoffman & Ertel

[57] ABSTRACT

A fishing reel consisting of a housing defining a line snubbing surface with structure at least partially within the housing for a) retrieving and storing a supply of fishing line and b) paying line out of the supply. A movable spinner head bears the line against a part of the line snubbing surface on the housing to thereby prevent payout of line from the fishing reel as a rod with the reel thereon is cocked for a cast. The part of the line snubbing surface has integrally formed texturing. The texturing accounts for a relatively high friction surface against which fishing line can be snubbed by the spinner head so that the line can be positively trapped against the surface to facilitate the performance of a cast without potentially damaging pressure being applied to the line.

8 Claims, 2 Drawing Sheets

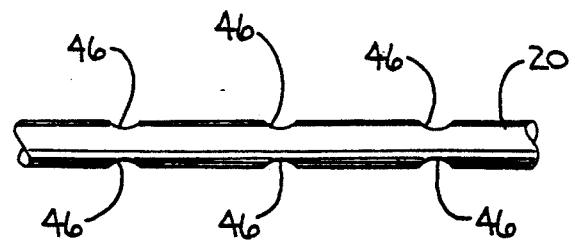
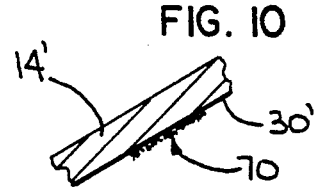
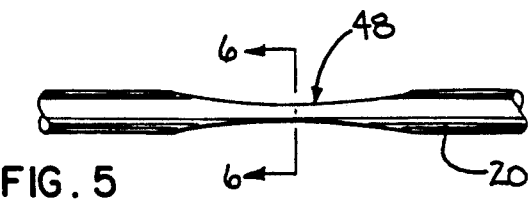
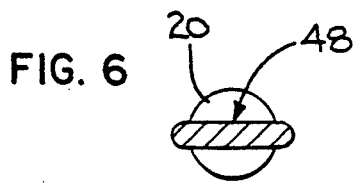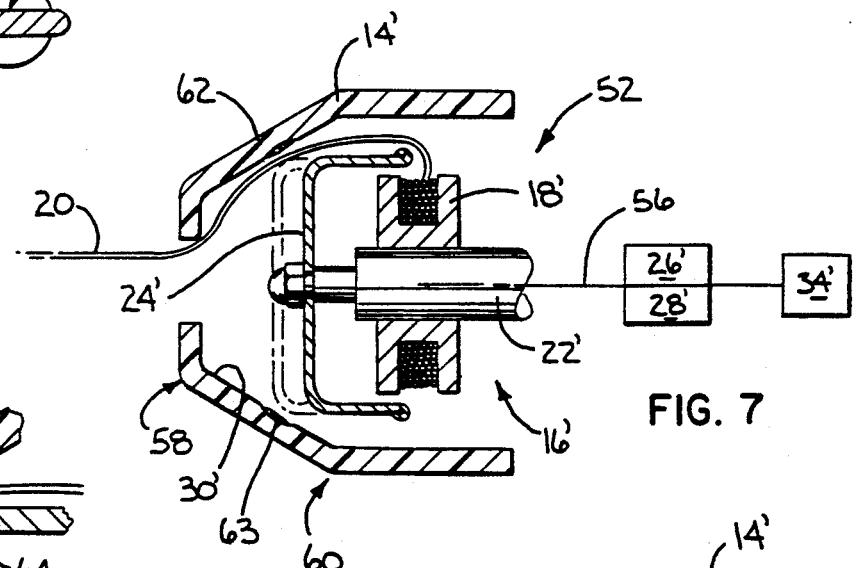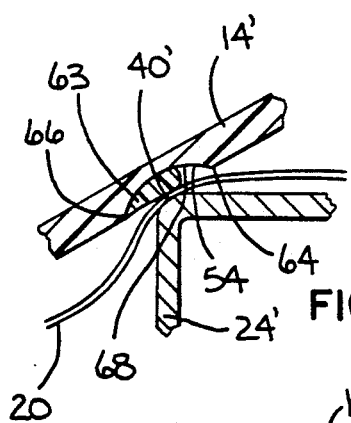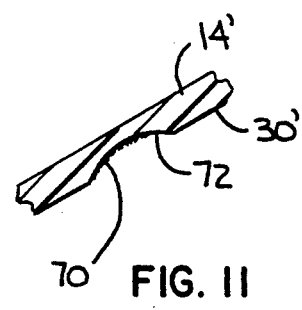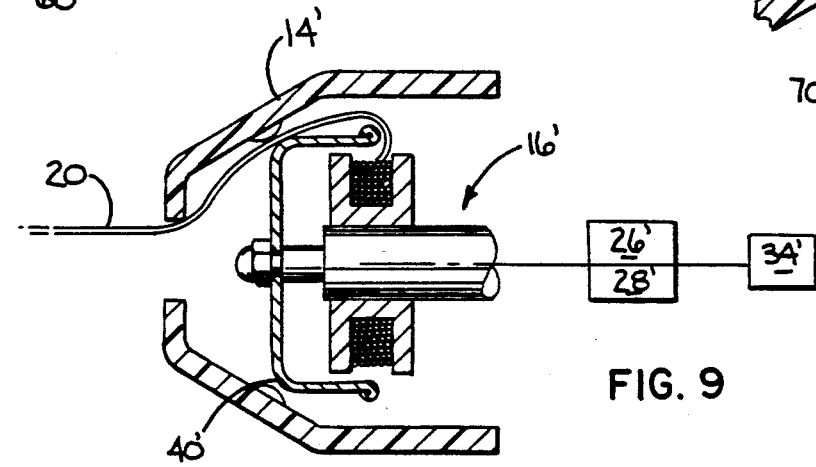

CASTING IMPROVEMENT FOR SPIN CAST FISHING REELS

BACKGROUND OF THE INVENTION

1. Field of the Invention

This invention relates to fishing reels of the spin cast-type and, more particularly, to structure for snubbing a fishing line to facilitate casting.

2. Background Art

Fishing reels of the spin cast-type have been around for decades. Typically, spin cast reels have a substantially closed housing for containing the reel operating mechanism. The operating mechanism contains a shiftable spinner head which is rotatable to direct line onto a spool. By the depression of a thumb button, the spinner head is advanced forwardly to snub fishing line, extending forwardly from the spool and out of the housing, against an inner surface of the housing to allow the fishing rod and reel to be cocked and thereafter thrust to effect a cast.

Typically, the spinner head and line snubbing surface are made from hard material, such as hard plastic or metal. When the spinner head is shifted against the line snubbing surface, a substantial force must be imparted to positively hold the line so that it does not escape as the user cocks the rod and reel.

One problem that has plagued the industry is that of the spinner head nicking the line as the line is snubbed. This creates a point of weakness which may result in line failure.

Another problem in the prior art devices, particularly those which contact metal to metal between the spinner head and line snubbing surface, is that the line may be ineffectively grasped. For example, if there is any irregularity in the spinner head and/or snubbing surface, the line may be only weakly squeezed therebetween. As the user cocks the rod and reel, the line may slip. The line may become flattened as it pays out slightly while being squeezed between the spinner head and line snubbing surface.

One solution to the above problem has been to provide a high friction, resilient surface on one of the spinner head and line snubbing surface. This resilient surface allows the line to be positively gripped without being deformed.

One such exemplary structure is shown in U.S. Pat. No. 3,697,011, to Christensen et al. Christensen et al employ an elastomeric ring for line snubbing purposes. While positive line snubbing occurs with such a structure, placement of the ring during manufacture is relatively difficult. Further, the elastomeric ring may inhibit line payout during a cast.

SUMMARY OF THE INVENTION

The present invention is specifically directed to overcoming the above enumerated problems in a novel and simple manner.

The present invention comprehends a fishing reel consisting of a housing defining a line snubbing surface with structure at least partially within the housing for a) retrieving and storing a supply of fishing line and b) paying line out of the supply. A movable spinner head bears the line against a part of the line snubbing surface on the housing to thereby prevent payout of line from the fishing reel as a rod with the reel thereon is cocked for a cast. The part of the line snubbing surface has integrally formed texturing. The texturing accounts for a relatively high friction surface against which fishing line can be snubbed by the spinner head so that the line can be positively trapped against the surface to facilitate the performance of a cast without potentially damaging pressure being applied to the line.

The housing surface part is made at least partially from one of metal and plastic. The texturing can be integrally formed with the plastic or metal or alternatively can be formed by roughening the housing surface after the housing is formed through machining or abrasion.

Because the texturing can be formed as an integral part of the housing, the need to assemble parts to produce a high friction surface is obviated. Consequently, manufacturing costs are minimized. The texturing will remain intact for the life of the reel. Thus it is not prone to deterioration as are conventional snubbing rings made of soft elastomeric materials. At the same time, the texturing can be made of sufficiently low profile that the line will not hang up thereon as might affect the casting characteristics for the reel.

In one form of the invention, the housing surface part has a recess and at least part of the texturing resides within the recess. This minimizes the possibility of line hangup as line is being paid out of the reel. Alternatively, a high friction, resilient snubbing element, such as a ring, can be placed within the recess.

In a preferred form, the recess is generally U-shaped in cross section with the "U" opening towards the axis of the spinner head. The texturing and/or snubbing element that is placed in the recess does not project out of the recess so as to provide an exposed edge for the line to snag on.

In one form of the invention, the insert is made from rubber.

In one form of the invention, the housing has a wall portion defining a conical shape diverging from the rear to the front of the reel. The conically shaped portion has front and rear ends and an annular, undercut recess is provided in the housing between the front and rear end of the conically shaped wall portion.

BRIEF DESCRIPTION OF THE DRAWINGS

FIG. 4 is an enlarged, fragmentary, elevation view of a fishing line showing nicks formed therein by conventional line snubbing structure;

FIG. 5 is a view as in FIG. 4 showing a length of line that is squeezed as by conventional line snubbing structure;

FIG. 6 is a cross sectional view of the line taken along line 6—6 of FIG. 5;

FIG. 7 is a side elevation view of a spin cast-type fishing reel with line snubbing structure according to the present invention incorporated therein and showing the reel in a retrieve mode;

FIG. 8 is an enlarged, fragmentary section view of the cooperation between a line snubbing surface on the reel housing and a spinner head with the reel in its cast mode;

FIG. 9 is a view as in FIG. 7 with a modified form of line snubbing structure according to the present invention;

FIG. 10 is an enlarged, fragmentary section view of a textured line snubbing surface on the reel housing in accordance with the present invention; and FIG. 11 is a view as in FIG. 10 of a modified form of line snubbing surface according to the present invention.

DETAILED DESCRIPTION OF THE DRAWINGS

Figure 1:
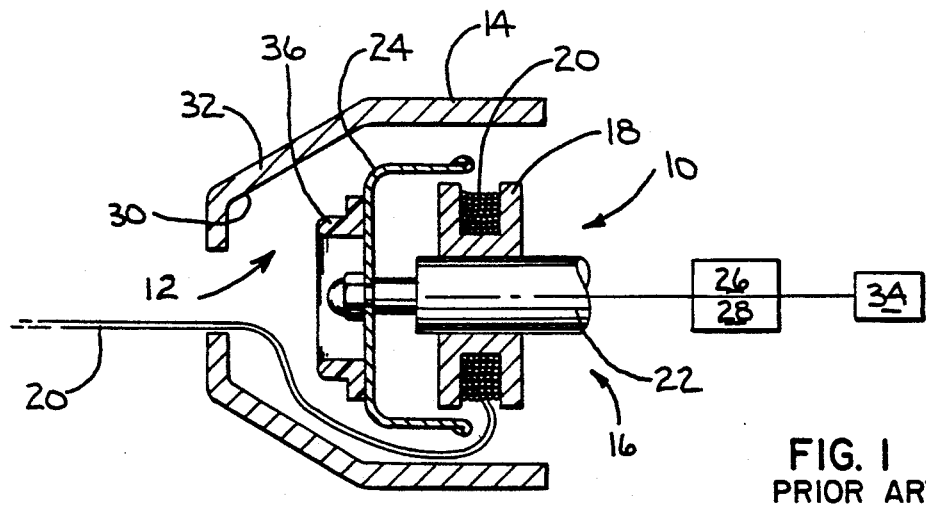
FIG. 1 is a side elevation view of a prior art spin cast reel showing one known form of line snubbing structure.

In FIG. 1, a conventional spin cast fishing reel is shown at 10 with a conventional line snubbing structure at 12. The reel 10 has an outer housing 14 which contains the reel operating mechanism at 16. The operating mechanism 16 consists of a spool 18 holding a supply of line 20 and mounted on a hub 22 that is an integral part of a fixed reel body. The operating mechanism 16 includes a rearwardly opening, cup-shaped spinner head 24, which is rotated by a drive mechanism 26 to wrap the line 20 around the spool 18. Another mechanism, shown schematically at 28 in FIG. 1, allows the user to selectively place the reel in the cast and retrieve modes.

In the retrieve mode, the spinner head 24 is spaced rearwardly of a conical line snubbing surface 30 defined by a wall 32 on the housing 14. Through the mechanism 28, which is generally operated by a thumb button 34, the spinner head 24 can be advanced forwardly to bear a stepped, resilient snubbing/brake ring 36 against the surface 30. So long as the user maintains the thumb button 34 depressed, the line 20 remains trapped between the ring 36 and line snubbing surface 30.

While the line snubbing ring 36 has proven to be effective in operation, it has several drawbacks. First, the snubbing ring 36 is a separate element that must be attached during the manufacturing process. This is a relatively tedious operation. The snubbing ring 36 is also prone to becoming nicked by the line and eventually wears out to the point that the reel performance may be compromised.

Figure 2:
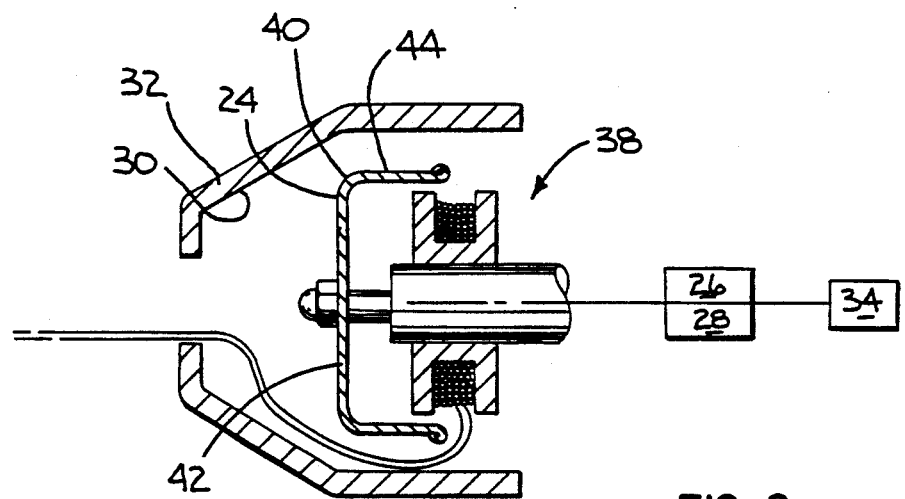
FIG. 2 is a side elevation view of a prior art spin cast reel with another known form of line snubbing structure.

FIG. 2 shows a second type of conventional line snubbing structure. The reel 38 in FIG. 2 has all the basic elements of the reel 10 in FIG. 1. The main difference is that the line snubbing ring 36 is absent from the spinner head 24. Instead, an annular, rounded corner 40 on the spinner head 24 formed at the juncture of the base 42 of the spinner head 24, and an annular skirt 44 extending rearwardly therefrom, is brought directly against the line snubbing surface 30 on the housing wall 32.

Since the spinner head 24 is normally made from metal and the housing wall 32 is normally made from metal or hard plastic, as the line is snubbed, a substantial pressure must be exerted on the line 20 between the low friction surfaces of the spinner head 24 and housing 14 to securely snub the line 20. As a result of the pressure there is a tendency of the spinner head 24 to nick the line 20. Nicks 46 commonly resulting from a structure such as that in FIG. 2 are shown on an enlarged portion of the line 20 in FIG. 4. On a magnified level, there may be a nick 46 in the line 20 from each cast. Each nick 46 provides a point of weakening in the line 20, which ultimately may lead to its premature failure.

Another problem with the line snubbing structure on the fishing reel 38 in FIG. 2 is that for the line snubbing to be effective there must be precise coaxial relationship between the snubbing corner 40 on the spinner head 24 and the inside housing surface 30. In the absence of a precise alignment between the spinner head 24 and housing surface 30, a slight gap may be maintained between the spinner head corner 40 and snubbing surface 30. The result is that the line 20 is often only weakly squeezed between the corner 40 and surface 30. As a cast is initiated, there is a tendency for the squeezed line to slip out. This effects a flattening of the line over a substantial length thereof, as seen at 48 in FIGS. 5 and 6. The result again is a weakening of the line 20 that may precipitate its failure.

Figure 3:
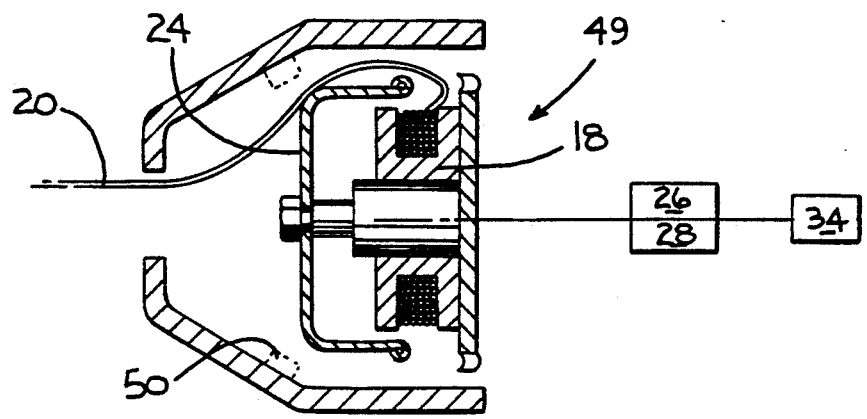
FIG. 3 is a side elevation view of a prior art spin cast reel showing still another known form of line snubbing structure.

A further prior art line snubbing structure is shown in a reel in FIG. 3 at 49. The reel 49 employs an annular insert 50 of high friction material. The insert 50 has a rectangular cross section and intercepts the forwardly moving spinner head 24 as the reel 49 is changed from its retrieve position to its cast position. The insert 50 is deformable to thereby avoid line nicking and squeezing as might otherwise result in line deformation as shown in FIGS. 4-6.

However, the principal difficulty with the insert 50 is that it projects radially inwardly of the housing sufficiently that it may be encountered by the unwinding line 20 as the cast is carried out. That is, once the thumb button 34 is released, the line unravels from the spool 18 and tends to hang up on the insert 50. This reduces the length of the cast and prevents smooth line payout.

The inventive line snubbing structure, which avoids the above problems, is shown in FIGS. 7-11. In FIGS. 7 and 8, one form of line snubbing structure, according to the invention, is shown on a reel 52 having an outer housing 14' and an internal operating mechanism 16', as in the prior art reels of FIGS. 1-3. A spinner head 24' is movable on the reel 52 from the solid line position of FIG. 7 to the phantom line position through depression of a thumb button 34'.

The housing 14' has a U-shaped recess 54 opening radially with respect to the axis 56 for the spinner head 24'. The recess 54 resides between the forward end and rearward end of a conical housing part 62 which defines the line snubbing surface 30'. The recess 54 is located so that the corner 40' of the spinner head 24' moves therewithin as the spinner head 24' moves forwardly into its cast position.

To facilitate line snubbing, a resilient, high friction insert 63 is provided in the form of an annular ring, such as an O-ring. The insert 63 may be made of rubber or other suitable material known to those skilled in the art. The insert 63, in its undeformed state, as seen in FIG. 7, does not project beyond a line bridging the corners 64, 66 where the wall surface 68, defining the recess 54, intersects the surface 30'. Because the insert 63 does not extend out of the recess 54 as the line 20 is paying off of the spool 18', there is no tendency of the line 20 to hang up on the insert 63. At the same time, a positive snubbing action is achieved on the line 20 between the spinner head corner 40' and insert 63.

A modified form of the invention is shown in FIGS. 9 and 10. the difference between the structure in FIGS. 9 and 10 and that in FIGS. 7 and 8 is that the housing 14' does not have the recess 54 formed therein. Instead the surface 30', in the vicinity of where the spinner head corner 40' abuts, is textured as at 70. This texturing can be accomplished by molding a roughened surface directly into the housing 14 or by roughening the surface 30' after formation of the housing 14' as by machining or abrasion so that the texturing and housing 14' are homogeneous. Alternatively, a coating could be applied to the surface 30'. The housing surface 30 may be either metal or plastic. In either event, the texturing accounts for an increased coefficient of friction which allows for positive holding of the line 20' without excessive pressure on the line 20 that might nick the line 20.

In FIG. 11, the housing 14' is slightly modified by providing an annular recess 70 defining a surface 72 therewithin that is textured as the surface 30' in the embodiment in FIGS. 9 and 10. The recess 70 assures that a smooth line guiding surface is provided along the entire extent of the surface 30'. Preferably the texturing does not project out of the recess 70.

The foregoing disclosure of specific embodiments is intended to be illustrative of the broad concepts comprehended by the invention.

I claim:

1. A fishing reel comprising:

a housing defining a line snubbing surface; and first means at least partially within said housing for selectively a) retrieving and storing a supply of fishing line and b) paying line out of said supply, said first means including a spinner head for bearing line against a first part of the line snubbing surface on the housing to thereby prevent payout thereof from the fishing reel, there being integrally formed first texturing on only a part of the line snubbing surface on the housing including at least a portion of said first part so that the first part of the line snubbing surface with the first texturing has a greater coefficient of friction than a second part of the line snubbing surface that does not have the first texturing, whereby the line can be positively trapped against the first part of the line snubbing surface to facilitate the performance of a cast without excessive application of pressure on the line, said first texturing and housing being homogeneous.

2. The fishing reel according to claim 1 wherein the first texturing and housing are made from plastic.

3. The fishing reel according to claim 1 wherein the first texturing and housing are made from metal.

4. The fishing reel according to claim 1 wherein the first texturing is molded directly into the housing.

5. The fishing reel according to claim 1 wherein the first texturing is defined by the step of roughening the housing surface after the housing surface is formed.

6. The fishing reel according to claim 5 wherein the housing surface part is abraded to produce the first texturing.

7. The fishing reel according to claim 1 wherein the housing surface part has a recess and at least part of the first texturing resides within the recess.

8. A fishing reel comprising:

a housing defining a line snubbing surface; and first means at least partially within said housing for selectively a) retrieving and storing a supply of fishing line and b) paying line out of said supply, said first means including a spinner head for bearing line against a first part of the line snubbing surface on the housing to thereby prevent payout thereof from the fishing reel, there being integrally formed first texturing on only a part of the line snubbing surface on the housing including at least a portion of said first part so that the first part of the line snubbing surface with the first texturing has a greater coefficient of friction than a second part of the line snubbing surface that does not have the first texturing, whereby the line can be positively trapped against the first part of the line snubbing surface to facilitate the performance of a cast without excessive application of pressure on the line, said first texturing and first and second housing surface parts being homogenous.

* * * * *